US012789089B2

(12) United States Patent
Poitrey et al.

(10) Patent No.: US 12,789,089 B2
(45) Date of Patent: Nov. 10, 2026

(54) SYSTEMS AND METHODS FOR GENERATING AND IMPLEMENTING VIDEO GAME CONTROL COMPOSITIONS ON SECOND SCREEN DEVICES

(71) Applicant: Netflix, Inc., Los Gatos, CA (US)

(72) Inventors: Olivier Jean Poitrey, Le Chesnay (FR); James Smith, Los Gatos, CA (US); Chase Rubin Meusel, Woodbury, MN (US)

(73) Assignee: Netflix, Inc., Los Gatos, CA (US)

( * ) Notice: Subject to any disclaimer, the term of this patent is extended or adjusted under 35 U.S.C. 154(b) by 204 days.

(21) Appl. No.: 18/193,620

(22) Filed: Mar. 30, 2023

(65) Prior Publication Data

US 2024/0325897 A1 Oct. 3, 2024

(51) Int. Cl.
*A63F 13/22* (2014.01)
*A63F 13/2145* (2014.01)
*A63F 13/537* (2014.01)

(52) U.S. Cl.
CPC ........ *A63F 13/537* (2014.09); *A63F 13/2145* (2014.09); *A63F 13/22* (2014.09)

(58) Field of Classification Search
None
See application file for complete search history.

(56) References Cited

U.S. PATENT DOCUMENTS 8,873,543 B2 10/2014 Hua et al.
11,870,585 B1 1/2024 Tayloe et al.
2001/0045941 A1 11/2001 Rosenberg et al.
2004/0160415 A1 8/2004 Rosenberg et al.
2005/0014561 A1 1/2005 Ouchi
2008/0294984 A1 11/2008 Ramsay et al.
2009/0085882 A1 4/2009 Grant et al.
(Continued)

FOREIGN PATENT DOCUMENTS

CN 108958625 12/2018
EP 1768346 A1 3/2007
(Continued)

OTHER PUBLICATIONS

"DroidJoy Server Tutorial"—https://github.com/grill2010/DroidJoy_Server/wiki/DroidJoy-Server-Tutorial to Grill, Nov. 10, 17 (Year: 2017).*

(Continued)

*Primary Examiner* — Damon J Pierce
(74) *Attorney, Agent, or Firm* — Hogan Lovells Cadwalader US LLP

(57) ABSTRACT

The disclosed computer-implemented methods and systems include generating and implementing video game control compositions like puzzle pieces that can be encoded into a video game once while providing functionality, positioning, and scalability in connection with multiple video game control elements. For example, the disclosed methods and system can cause video game control elements from a video game control composition to be rendered on the second screen device according to positioning instructions associated with an area defined by the composition and scaling instructions that are specific to characteristics of the second screen device. Various other methods, systems, and computer-readable media are also disclosed.

20 Claims, 5 Drawing Sheets

(56) References Cited

U.S. PATENT DOCUMENTS

| | | | |
|---|---|---|---|
| 2009/0184921 | A1 | 7/2009 | Scott et al. |
| 2010/0194547 | A1 | 8/2010 | Terrell et al. |
| 2011/0256930 | A1 | 10/2011 | Jaouen |
| 2012/0319938 | A1 | 12/2012 | Gervais |
| 2013/0084977 | A1 | 4/2013 | Miodunski |
| 2014/0198130 | A1 | 7/2014 | Lacroix |
| 2014/0232657 | A1 | 8/2014 | Aviles et al. |
| 2014/0315642 | A1 | 10/2014 | Grant et al. |
| 2014/0320435 | A1 | 10/2014 | Modarres et al. |
| 2015/0177837 | A1 | 6/2015 | Yliaho |
| 2015/0182856 | A1 | 7/2015 | Mays, III et al. |
| 2015/0268725 | A1 | 9/2015 | Levesque et al. |
| 2015/0293592 | A1 | 10/2015 | Cheong et al. |
| 2018/0011538 | A1 | 1/2018 | Rihn et al. |
| 2018/0028915 | A1 | 2/2018 | Doucet et al. |
| 2019/0083882 | A1 | 3/2019 | Soelberg et al. |
| 2019/0149637 | A1 | 5/2019 | Howell |
| 2019/0212916 | A1 | 7/2019 | Wang |
| 2019/0235627 | A1 | 8/2019 | Klein |
| 2019/0235753 | A1 | 8/2019 | Lou et al. |
| 2020/0101382 | A1 | 4/2020 | Wheeler et al. |
| 2021/0113927 | A1 | 4/2021 | Zimring et al. |
| 2021/0402292 | A1 | 12/2021 | Chow |
| 2022/0080299 | A1 | 3/2022 | Nixon et al. |
| 2022/0291822 | A1 | 9/2022 | Wheeler et al. |
| 2024/0419263 | A1 | 12/2024 | Stoeckli et al. |
| 2025/0110574 | A1 | 4/2025 | Alonso et al. |
| 2025/0112008 | A1 | 4/2025 | Lin et al. |

FOREIGN PATENT DOCUMENTS

| | | | |
|---|---|---|---|
| KR | 20180042580 | | 4/2018 |
| KR | 101915789 | B1 | 11/2018 |
| WO | 2013095946 | A1 | 6/2013 |
| WO | 2020226229 | A1 | 12/2020 |
| WO | 2022096467 | A1 | 5/2022 |
| WO | 2022256008 | A1 | 12/2022 |

OTHER PUBLICATIONS

YouTube video, "How to Emulate or Use Android Device as a Gamepad For Windows | DroidJoy Tutorial | Easy Method" https://www.youtube.com/watch?v=cd6ErGFy0Js to Multiverse Tv, Mar. 14, 21 (Year: 2021).*

"Smart Controller" The New Way to Play Video Games, The Wayback Machine—https://web.archive.org/web/20180323172315/https://smartcontrolerapp.com/; 2 pages.

International Search Report and Written Opinion for International Application No. PCT/US2024/022100, mailed Aug. 8, 2024; 11 pages.

United States Non-Final Office Action for U.S. Appl. No. 18/193,615, mailed Mar. 21, 2025; 13 pages.

United States Non-Final Office Action for U.S. Appl. No. 18/193,622, mailed May 15, 2025; 13 pages.

United States Non-Final Office Action for U.S. Appl. No. 18/193,626, mailed Apr. 11, 2025; 12 pages.

United States Non-Final Office Action for U.S. Appl. No. 18/193,625, mailed Apr. 14, 2025; 14 pages.

International Preliminary Report on Patentability for PCT Application No. PCT/US2024/022098, report issued on Sep. 20, 2025; 10 pages.

International Preliminary Report on Patentability for PCT Application No. PCT/US2024/022100, report issued on Sep. 20, 2025; 7 pages.

International Preliminary Report on Patentability for PCT Application No. PCT/US2024/022101, report issued on Sep. 20, 2025; 5 pages.

International Preliminary Report on Patentability for PCT Application No. PCT/US2024/022103, report issued on Sep. 20, 2025; 5 pages.

International Preliminary Report on Patentability for PCT Application No. PCT/US2024/022104, report issued on Sep. 20, 2025; 7 pages.

Torok, et al., "Smart Controller: Introducing a dynamic interface adapted to the gameplay" Entertainment Computing, vol. 27, 2018, p. 32-46, www.elsevier.com/locate/entcom; 15 pages.

"Smart Controller" The New Way to Play Video Games, The Wayback Machine—https://web.archive.org/web/20180323172315/https://smartcontrolerapp.com/; XP93186123A1; 2 pages.

"How to change the notification settings in Windows", Dec. 10, 31, 2020, retrieved from https://www.computerhope.com/issues/ch00177.htm; 10 pages.

"Sound—Win32 apps / Microsoft Learn", Jun. 3, 2021, retrieved from https://learn.microsoft.com/en-us/windows/win32/uxguide/vis-sound; 12 pages.

"Real-time Multiplayer Software Architecture"; Olli Vilmi; Mar. 13, 2020; 59 pages.

"DroidJoy Server Tutorial"—https://github.com/grill2010/DroidJoy_Server/wiki/DroidJoy-Server-Tutorial.

"How to Emulate or Use Android Device as a Gamepad for Windows—DroidJoy Tutorial—Easy Method" https://www.youtube.com/watch?v=cd6ErGFy0Js.

United States Non-Final Office Action for U.S. Appl. No. 18/193,626, mailed Oct. 22, 2025; 10 pages.

United States Non-Final Office Action for U.S. Appl. No. 18/193,622, mailed Sep. 8, 2025; 11 pages.

United States Final Office Action for U.S. Appl. No. 18/193,620, mailed Aug. 1, 2025; 21 pages.

Non-Final Office Action issued in U.S. Appl. No. 18/193,626 dated Apr. 17, 2026.

Notice of Allowance issued in U.S. Appl. No. 18/193,625 dated Oct. 9, 2025.

Non-Final Office Action issued in U.S. Appl. No. 18/193,622 dated Jan. 28, 2026.

* cited by examiner

SYSTEMS AND METHODS FOR GENERATING AND IMPLEMENTING VIDEO GAME CONTROL COMPOSITIONS ON SECOND SCREEN DEVICES

BACKGROUND

Video games continue to be a popular and pervasive form of entertainment. Video gaming platforms constantly try to create video games that are faster, more exciting, and more immersive. Typically, a video game is played on a game console or computer that displays game graphics via a display device such as a TV or monitor, while a player interacts with the displayed game via a physical controller or other input device. Physical video game controllers generally include a number of control elements such as buttons, joysticks, track pads, paddles, and so forth.

In some instances, such as with mobile gaming, a video game may include buttons and other control elements that are displayed on a touch screen display. Positioning buttons and other video game control elements on a touch screen display, however, may not be a straightforward task. For example, it can be difficult to discover the best placement for video game control elements within a touch screen display such that a video game player can both (1) view the game displayed on the touch screen display (i.e., the control elements need to be positioned so that they do not obscure the video game being displayed and/or take up too much real estate on the touch screen display) and (2) comfortably hold the display device and interact with the displayed video game control elements for longer periods of time. Similarly, it can be difficult to determine optimal combinations of control elements to place within various areas of the touch screen display.

Discovering and implementing optimal layouts of video game control elements can be an exhaustive and resource intensive process. For example, video game designers may go through numerous iterations in an attempt to identify optimal layouts, including encoding a particular layout of video game control elements into a video game, releasing the video game for testing, and making changes to the encoded layout based on the testing. This process can drain computing resources including processing, memory, and network resources, especially when the video game designer has to engage in a high number of iterations to land on a video game control layout that resonates with players of the video game.

Even when the video game designer finally gets a layout right, further testing and design may be needed when the layout is used in connection with a different touch screen display. For example, even if a layout of video game control elements is successful when implemented on a smartphone touch screen display, this same layout may or may not be adequate when implemented on a different type of touch screen display, such as a tablet touch screen display. At that point, the video game designer may need to engage in the same, wasteful iterations of layout testing before discovering how the layout needs to change to be correctly implemented on this larger touch screen display.

SUMMARY

As will be described in greater detail below, the present disclosure describes implementations that cause video game control elements within a pre-validated video game control composition to be rendered on a second screen device according to both positioning instructions and scaling instructions dictated by the composition-thereby negating the need for the time and resource-intensive iterative testing process described above. In one example, a computer-implemented method can include detecting a request for a video game control composition to be rendered on a second screen device that serves as a game controller for a video game displayed on a first screen device, identifying the video game control composition that includes a plurality of video game control elements, positioning instructions for the plurality of video game control elements, and scaling instructions for the plurality of video game control elements, determining one or more characteristics of the second screen device, and causing the plurality of video game control elements from the video game control composition to be rendered on the second screen device according to the positioning instructions and the scaling instructions in view of the one or more characteristics of the second screen device.

In one example, detecting the request for the video game control composition may be in response to a programming call within the video game, or a system request as part of initiating the video game. Additionally, the request for the video game control composition to be rendered on the second screen device can include a request for the plurality of video game control elements from the video game control composition to be rendered in a first area of the second screen device.

In some examples, the computer-implemented method can further include detecting a request for an additional video game control composition to be rendered in a second area of the second screen device simultaneously with the plurality of video game control elements from the video game control composition in the first area of the second screen device, and causing video game control elements from the additional video game control composition to be rendered in the second area of the second screen device.

In some examples, determining one or more characteristics of the second screen device can include determining one or more of a make of the second screen device, a display size of the second screen device, or display preferences associated with the second screen device. Additionally, the positioning instructions can include instructions for rendering a video game control element within the video game control composition relative to an edge of the second screen device, while the scaling instructions can include instructions for rendering a video game control element within the video game control composition according to the make of the second screen device or relative to the display size of the second screen device.

In some examples, causing the plurality of video game control elements from the video game control composition to be rendered on the second screen device can further include causing the plurality of video game control elements from the video game control composition to be rendered on the second screen device according to the display preferences associated with the second screen device. Additionally, identifying the video game control composition can include identifying the video game control composition within a repository of pre-validated video game control compositions.

Some examples described herein include a system with at least one physical processor and physical memory including computer-executable instructions that, when executed by the at least one physical processor, cause the at least one physical process to perform various acts. In at least one example, the computer-executable instructions, when executed by the at least one physical processor, cause the at least one physical processor to perform acts including detecting a request for a video game control composition to be rendered on a second screen device that serves as a game controller for a video game displayed on a first screen device, identifying the video game control composition that includes a plurality of video game control elements, positioning instructions for the plurality of video game control elements, and scaling instructions for the plurality of video game control elements, determining one or more characteristics of the second screen device, and causing the plurality of video game control elements from the video game control composition to be rendered on the second screen device according to the positioning instructions and the scaling instructions in view of the one or more characteristics of the second screen device.

In some examples, the above-described method is encoded as computer-readable instructions on a computer-readable medium. In one example, the computer-readable instructions, when executed by at least one processor of a computing device, cause the computing device to detect a request for a video game control composition to be rendered on a second screen device that serves as a game controller for a video game displayed on a first screen device, identify the video game control composition that includes a plurality of video game control elements, positioning instructions for the plurality of video game control elements, and scaling instructions for the plurality of video game control elements, determine one or more characteristics of the second screen device, and cause the plurality of video game control elements from the video game control composition to be rendered on the second screen device according to the positioning instructions and the scaling instructions in view of the one or more characteristics of the second screen device.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
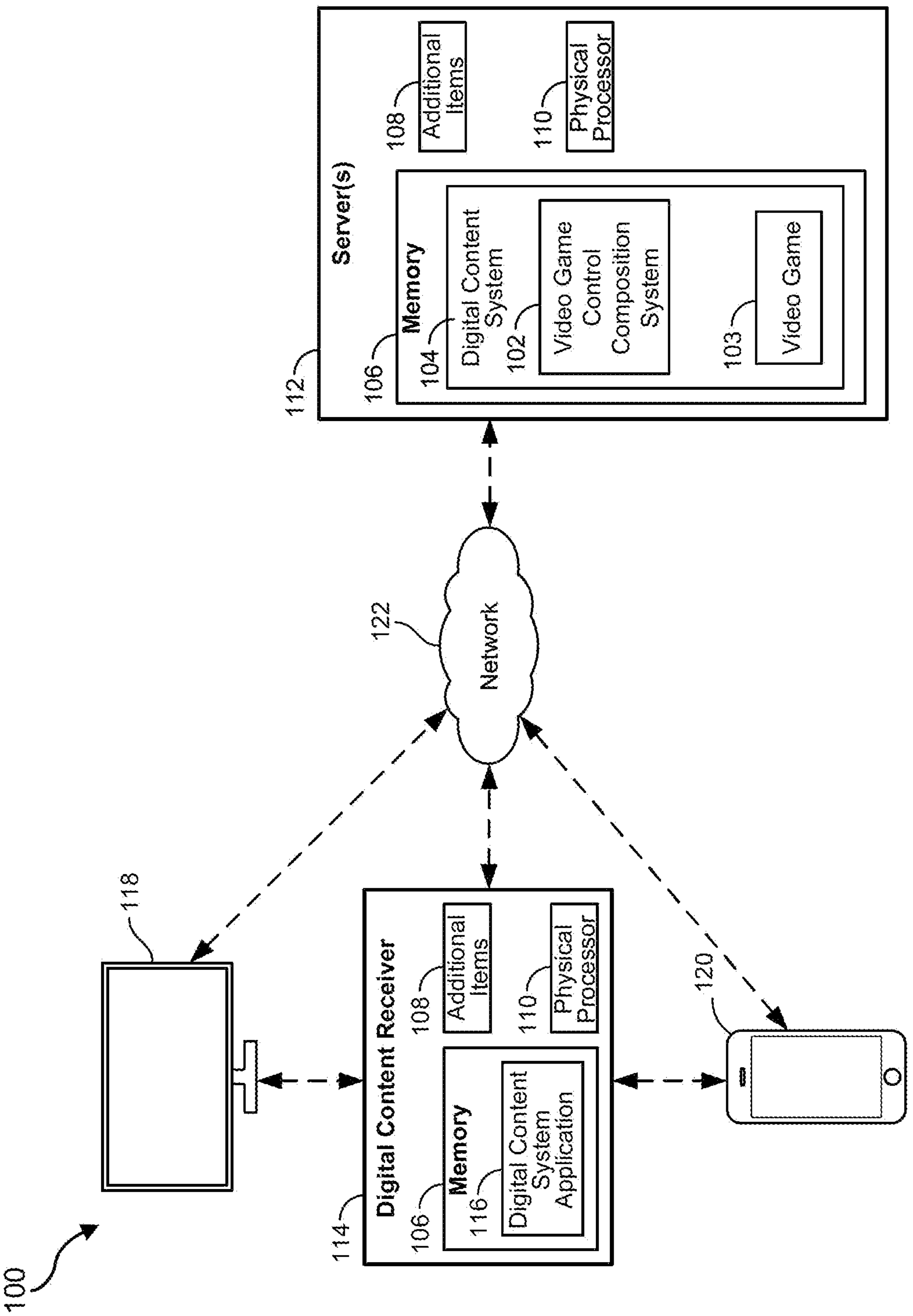
FIG. 1 is a block diagram of an exemplary environment for implementing a video game control composition system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, designing and implementing video game control layouts is often problematic-particularly in the mobile gaming space (i.e., where physical controllers may not be used) and in connection with video games where a second screen device (e.g., such as a smartphone) is used as a video game controller. These problems may arise because layouts of video game control elements must be individually encoded into a video game and then exhaustively tested and modified over numerous iterations. This can lead to computational waste as video game designers go through this iterative process. Once tested, a particular layout may still prove to be ineffective when the video game is played on a different type of device with different display dimensions. Moreover, even when a video game layout is shown to be effective in connection with a particular video game, allowing ad hoc video game layouts per game can lead to player confusion when moving between video games-ultimately resulting in a reduction in usability across an entire video game platform that supports those video games.

In light of these problems, the present disclosure describes a system that generates and implements validated video game control compositions for use in video game development and play. For example, the implementations described herein can generate and store a video game control composition that includes multiple video game control elements, as well as encoded instructions for how the video game control elements should be positioned relative to the edges of a touch screen display controller. Additionally, the implementations described herein can generate the video game control composition with encoded instructions on how the video game control elements should scale when the associated video game is played in connection with a touch screen display controller of a different type or display size. Once generated, a video game designer may encode the full, validated video game control composition into the video game, rather than individually testing and encoding each video game control element referenced by the composition.

In this way, the implementations described herein avoid the various types of computational waste generated by the traditional process of iteratively testing video game control element layouts because each video game control composition has been pre-validated to ensure an optimal layout of video game control elements. Moreover, the implementations described herein bypass the other inefficiencies common to designing video game control layouts by providing developers with the flexibility to mix and match multiple different validated compositions like puzzle pieces to provide different layouts and functionality. In addition, because each composition contains multiple video game control elements, a single composition needs only to be encoded into a video game to provide the functionality of all of the underlying video game control elements included in the composition, resulting in improved development and testing efficiencies.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
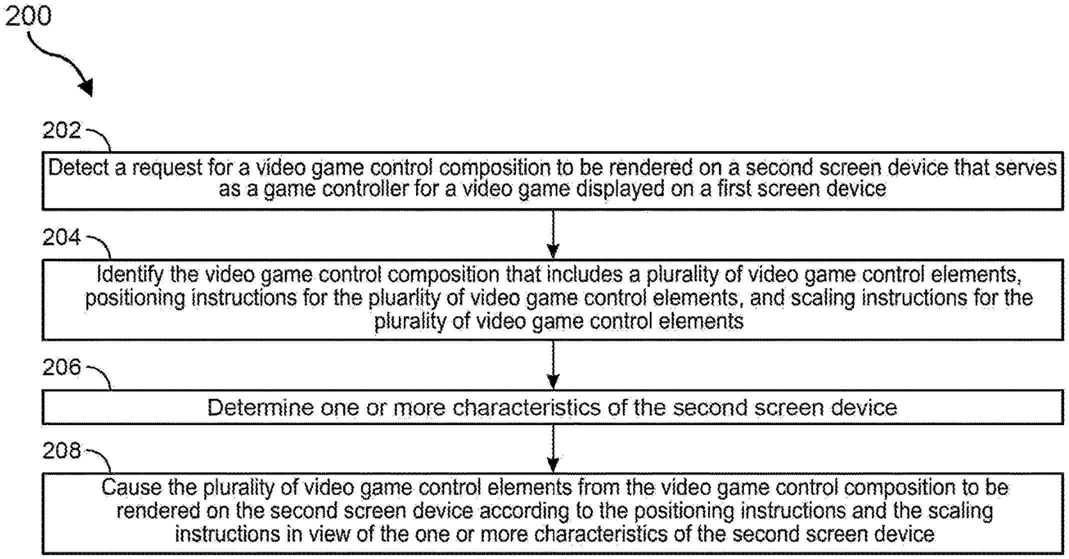
FIG. 2 is a flow diagram of an exemplary computer-implemented method for causing video game control elements from a video game control composition to be rendered on a second screen device in accordance with one or more implementations.
Figure 3A:
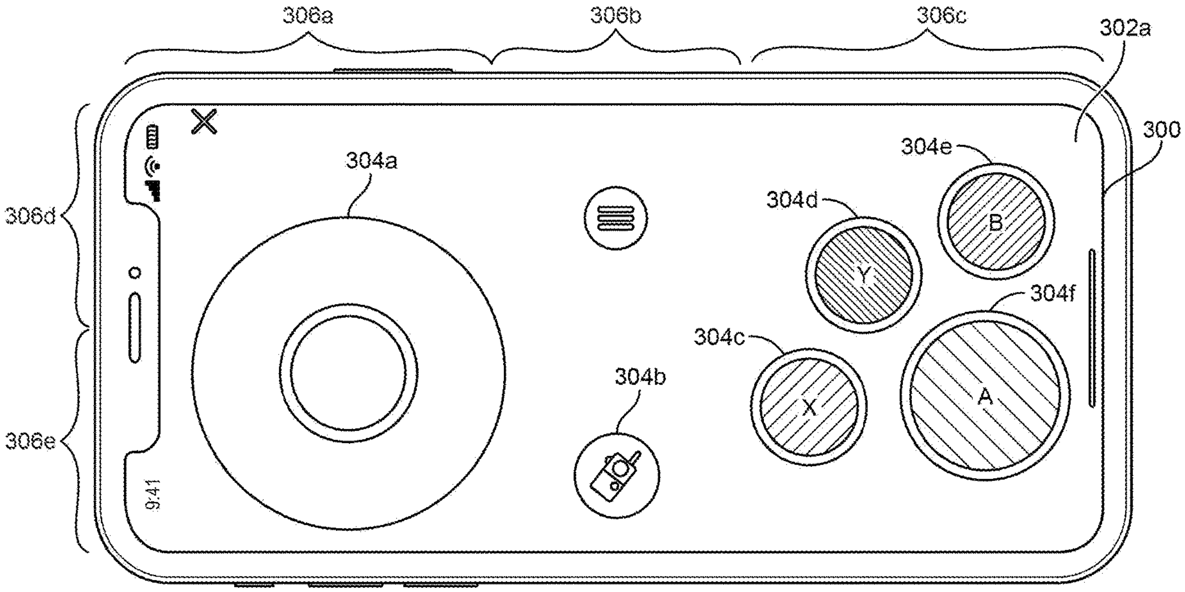
FIGS. 3A-3D illustrate how the video game control composition system can cause video game control elements to be rendered on a second screen device according to a video game control composition in accordance with one or more implementations.
Figure 3B:
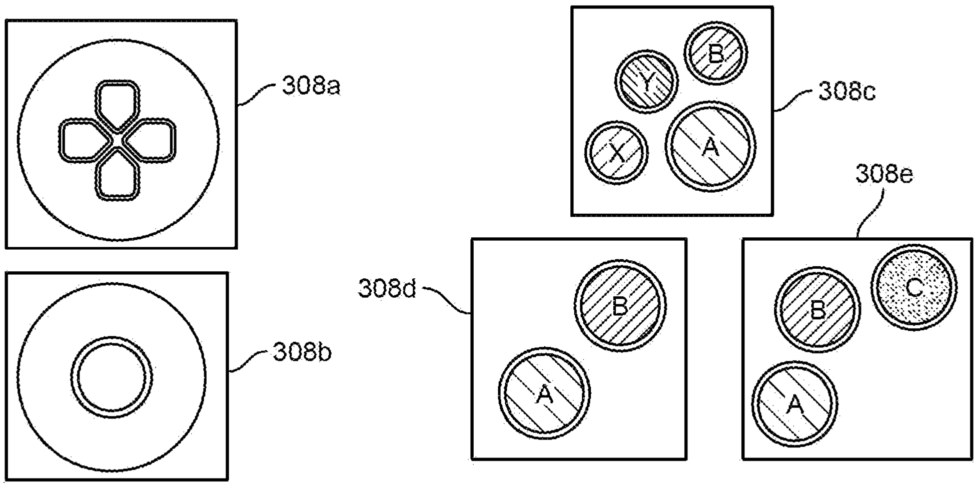
Figure 3C:
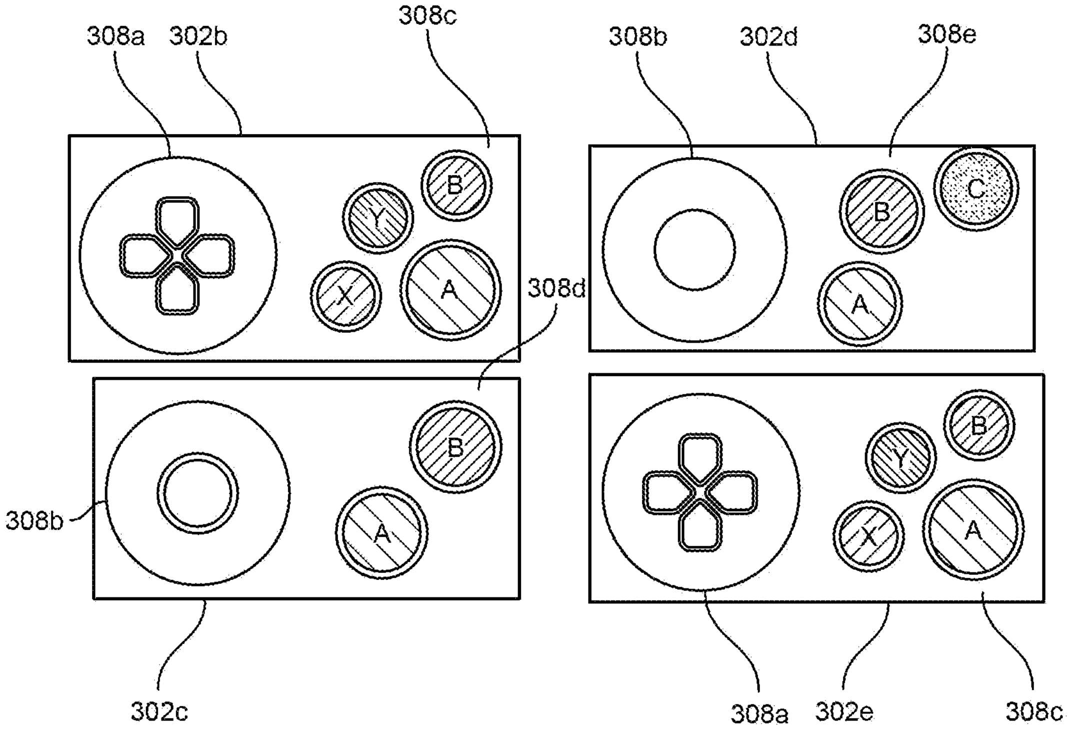
Figure 3D:
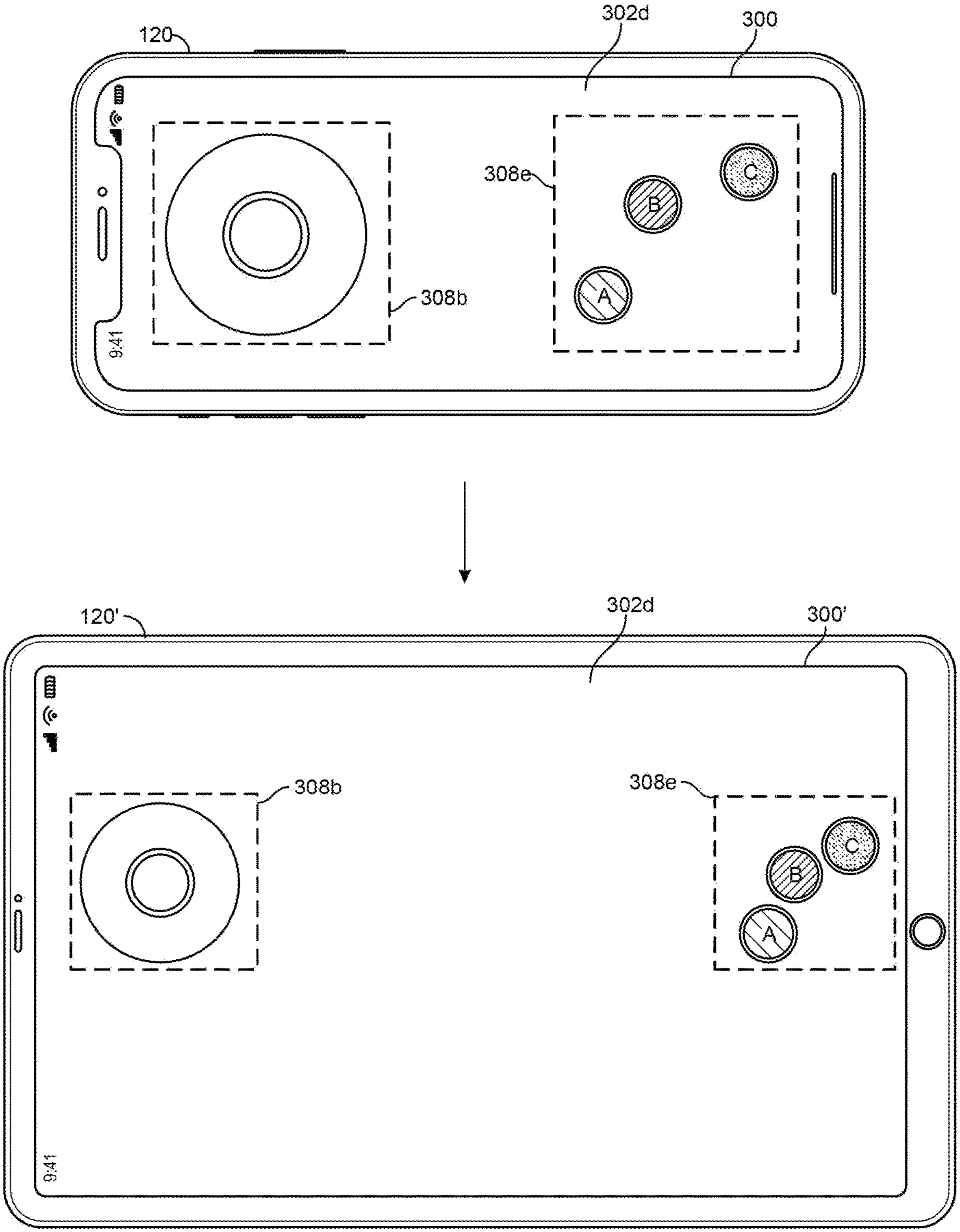
Figure 4:
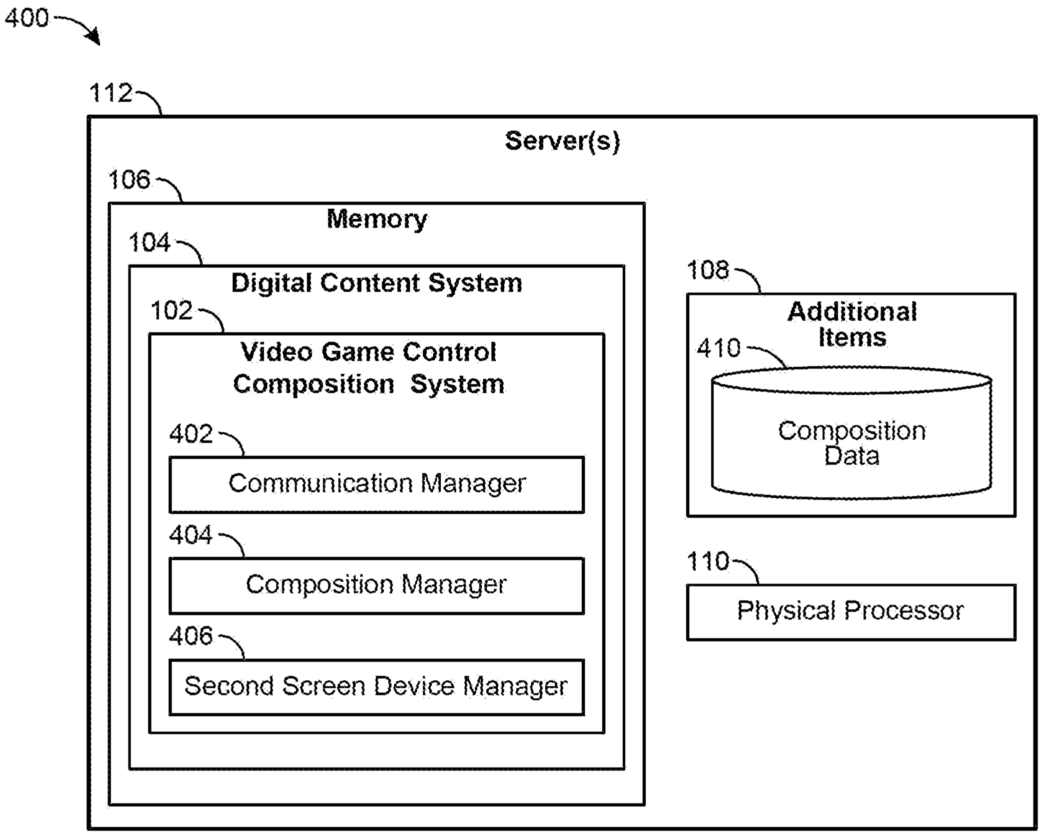
FIG. 4 is a detailed diagram of the video game control composition system in accordance with one or more implementations.

The following will provide, with reference to FIGS. 1-4, detailed descriptions of a video game control composition system that generates and implements video game control compositions. For example, an exemplary network environment is illustrated in FIG. 1 to show the video game control composition system in connection with a first screen device and a second screen device. FIG. 2 illustrates steps taken by the video game control composition system to generate video game control compositions for use on the second screen device during game play. FIG. 3A-3D illustrates example video game control compositions generated by the video game control composition system. Finally, FIG. 4 provides additional detail with regard to the features and functionality of the video game control composition system.

As just mentioned, FIG. 1 illustrates an exemplary networking environment 100 implementing aspects of the present disclosure. For example, the networking environment 100 can include server(s) 112, a digital content receiver 114, a first screen device 118, a second screen device 120, and a network 122. As further shown, the server(s) 112 and the digital content receiver 114 can include a memory 106, additional items 108, and a physical processor 110.

In one or more implementations, as shown in FIG. 1, the first screen device 118 may be a television and the second screen device 120 may be a smartphone. In some examples, the display of the second screen device 120 is a touch screen display that may serve as a controller for the video game 103 displayed on the first screen device 118. As further shown, the digital content receiver 114 may be a device that is separate from the first screen device 118 and the second screen device 120, and the first screen device 118 may be physically separate from the second screen device 120. In this implementation, the digital content receiver 114, the first screen device 118, and the second screen device 120 may be on the same subnet (e.g., within the same residence or location), or may be on different subnets. In additional implementations, the digital content receiver 114 and/or the functionality of the digital content receiver 114 may be incorporated into the first screen device 118 and/or the second screen device 120. In yet additional implementations, the first screen device 118 may be a digital projector, monitor, or other display device. Similarly, the second screen device 120 may be a tablet computer, a smart wearable device, or any other type of device with an interactive touch screen display.

As further shown in FIG. 1, a video game control composition system 102 may be implemented as part of a digital content system 104 within the memory 106 on the server(s) 112. In one or more implementations, the digital content system 104 may include a subscription streaming service for providing digital media (e.g., movies, TV shows, video games, etc.) to content subscribers. Additionally, the video game control composition system 102 may access the video game 103, run the video game 103, stream output from the video game 103 to one or more of the first screen device 118 and the second screen device 120 (e.g., to cause the first screen device 118 to render game graphics, to cause the second screen device 120 to display video game control elements such as buttons, joysticks, etc.), receive control inputs from a video game controller (e.g., such as the second screen device 120), etc. In one or more implementations, the video game control composition system 102 works in concert with the video game 103 to change game states, update game graphics, render video game control compositions or cause video game control compositions to be rendered on the second screen device 120, receive control inputs from the second screen device 120, and update game graphics on the first screen device 118 based on the inputs.

As further shown in FIG. 1, the digital content receiver 114 may include a digital content system application 116 stored within the memory 106. In some implementations, the digital content system application 116 may communicate information to and from the digital content system 104 via the network 122. In at least one implementation, the digital content system 104—in concert with the video game 103—may access and utilize data received by the digital content system 104 in generating and providing video game control compositions.

In some implementations, the digital content system application 116 may be additionally installed on the first screen device 118 and/or the second screen device 120. For example, in one implementation, the first screen device 118 may receive video game display information via the digital content receiver 114 and the second screen device 120 may communicate directly with the server(s) 112 via an additional instance of the digital content system application 116 installed thereon. For example, the digital content system application 116 may be embedded on the second screen device 120 such that the second screen device 120 may communicate directly with the digital content system 104 and/or the video game control composition system 102. In an additional implementation, the first screen device 118 may utilize an instance of the digital content system application 116 installed thereon to communicate directly with the digital content system 104 and/or the video game control composition system 102 via the network 122 while the second screen device 118 may utilize a separate instance of the digital content system application 116 installed thereon to communicate directly with the digital content system 104 and/or the dynamic hit zone system 102 also via the network 122. In some implementations, the networking environment 100 may not include the digital content receiver 114.

As mentioned above, the digital content receiver 114 (and in some implementations the first screen device 118 and/or the second screen device 120) may be communicatively coupled with the server(s) 112 through the network 122. In one or more implementations, the network 122 may represent any type or form of communication network, such as the Internet, and may include one or more physical connections, such as a LAN, and/or wireless connections, such as a WAN. In some implementations, the network 122 may represent a telecommunications carrier network. In at least one implementation, the network 122 may represent combinations of networks such that the digital content receiver 114 and the first screen device 118 may communicate with the digital content system 104 via a wireless network while the second screen device 120 may communicate with the dynamic hit zone system 102 via a cellular network.

Although FIG. 1 illustrates components of the exemplary networking environment 100 in one arrangement, other arrangements are possible. For example, in one implementation, the video game control composition system 102 can operate as a native application that may be installed on the digital content receiver 114 and/or the second screen device 120. In another implementation, the video game control composition system 102 may operate across multiple servers. Moreover, in some implementations, the exemplary networking environment 100 may include multiple second screen devices 120—such as when a multiplayer game is being played on the first screen device 118. Similarly, the exemplary networking environment 100 may also include multiple first screen devices 118 such as when multiple players are playing a video game on separate displays. For example, in that implementation, the video game control composition system 102 can support the same video game being played by multiple players (e.g., on multiple second screen devices and multiple first screen devices) across multiple locations and on different user accounts within the digital content system 104.

In one or more implementations, the methods and steps performed by the video game control composition system 102 reference multiple terms. For example, a "video game" can refer to a compiled digital program that causes game graphics to be rendered on a display device, such as a first screen device as user inputs received via a second screen device manipulate or interact with the rendered game graphics. A video game may include points, places, junctures, levels, characters, and other displayed objects.

As used herein, a "video game control composition" can refer to a grouping of video game control elements. For example, a video game control composition can include a listing of video game control elements and computer-readable instructions on how to render those video game control elements within the grouping. To illustrate, a video game control composition may include a joystick video game control element and two button video game control elements. The composition may further include instructions that dictate the size at which these video game control elements should be rendered, and how the joystick should be positioned relative to the two buttons and vice versa.

As used herein, a "video game control element" can include any type of interactive control that can be displayed on a second screen device. For example, video game control elements can include, but are not limited to, joysticks, buttons, trackpads, triggers, switches, radio buttons, and so forth. A video game control element may also include gameplay elements that are specific to the video game being played (e.g., a deck of cards, an inventory of items). Video game control elements may be rendered at any of various sizes and can be rendered at any position within a touch screen display. When a video game control element is included in or referenced by a video game control composition, the video game control element may be rendered at any position within an area defined by the video game control composition at a position within that area as defined by the video game control composition.

As used herein, the term "positioning instructions" can refer to instructions that dictate where a video game control element referenced by a video game control composition should be rendered in an area defined by the video game control composition and/or where the video game control composition should be rendered relative to an edge of the second screen device 120. In at least one implementation, a goal of the positioning and scaling instructions (discussed below) is to ensure that an associated video game control composition is displayed with a consistent size and consistent edge distances, no matter the size of the second screen device 120. For example, a composition's positioning instructions can dictate that the two video game control elements referenced by the composition should be rendered at opposite horizontal sides of the area defined by the composition (e.g., a 150-pixel by 150-pixel area) but within 50 pixels of each other.

Additionally, the positioning instructions can dictate how a video game control composition should be positioned relative to the edges of the touch screen display of the second screen device (e.g., the second screen device 120) that is acting as the controller for the video game based on margins (e.g., measured in physical units such as inches, measured in display units like pixels). For example, the positioning instructions can indicate an intended margin and a smallest margin. In one or more implementations, a composition's intended margin can be an optimal distance for positioning the composition relative to an edge of the second screen device 120, while the composition's smallest margin can indicate a minimum distance from the edge of the second screen device 120 for placing the composition. In at least one implementation, if the display of the second screen device 120 is not large enough to accommodate the composition's minimum distance, the video game control composition system 102 may not enable the composition to be rendered on the second screen device 120.

Additionally, as used herein, the term "scaling instructions" can refer to instructions that dictate how video game control elements referenced by a video game control composition should be rendered in view of one or more characteristics of the second screen device where the video game control elements are being rendered. For example, a composition's scaling instructions may dictate that two video game control elements referred to by the composition should be rendered at a small size and within 20 pixels of each other when the composition is rendered on a smartphone. The same scaling instructions may dictate that the two video game control elements should be rendered at a medium size and within 75 pixels of each other when the composition is rendered on a tablet computer. As such, the scaling instructions can modify the size and placement of a video game control element within an area defined by the video game control composition.

As such, "characteristics of the second screen device" can include information associated with the second screen device that can affect how a video game control composition is rendered on the second screen device. For example, characteristics of the second screen device can include a make of the second screen device (e.g., a brand of the second screen device), a model of the second screen device (e.g., a product name of the second screen device), and a display size of the touch screen display of the second screen device.

In one or more implementations, the second screen device may include native display screen scaling capabilities. For example, these capabilities may serve to make displayed content easier for the user to interact with and/or see. In at least one implementation, the positioning and scaling instructions generated by the video game control composition system 102 in connection with the characteristics of the second screen device may override or counteract the second screen device's native display screen scaling capabilities. For example, the native display screen scaling capabilities may not be effective in connection with the video game control composition system 102 because generic scaling of video game control compositions may not yield consistent results in connection with differently sized displays. Instead, the video game control composition system 102 implements customized positioning and scaling instructions that are specifically tailored to optimized player usability.

As used herein, a "display preference" can include a user setting configured relative to the second screen device. For example, a display preference can instruct that text be displayed at a particular size, colors be displayed within a particular spectrum, and so forth. As used herein, "areas of a second screen device" can refer to areas within the touch screen display of the second screen device where a video game control composition may be rendered. For example, areas of the second screen device may include a right-hand side of the touch screen display, a left-hand side of the touch screen display, a top-half of the touch screen display, a bottom-half of the touch screen display, a right-hand top corner of the touch screen display, a right-hand bottom corner of the touch screen display, a left-hand top corner of the touch screen display, a left-hand bottom corner of the touch screen display, a central portion of the touch screen display, etc. In one or more implementations, multiple video game control compositions may be rendered into separate areas of the second screen device. In most implementations, only one video game control composition may be rendered into an area of the second screen device at a time.

As used herein, "pre-validated" refers to a type of video game control composition that has already been shown to be an optimized collection of positioned video game control elements and associated scaling instructions. In one or more implementations, a pre-validated video game control composition can be encoded into a video game without any of the same testing cycles needed by previous systems.

As such, "control inputs" can refer to data representing how a particular video game control is interacted with during game play. For example, a control input can indicate that a button control was pressed and held for five seconds during game play. "Touch gestures" can refer to types of interactions that may be detected in connection with video game controls. For example, a touch gesture can be a tap touch gesture, a press-and-hold touch gesture, a press-and-slide touch gesture, a multi-finger touch gesture, and/or a variable pressure touch gesture. Control inputs can further include sound inputs such as record or streamed via a microphone of the second screen device. Additionally, gyroscopic inputs can include changes detected in connection with a gyroscope of the second screen device that indicate that the second screen device is being tilted, rotated, tipped, etc.

As mentioned above, FIG. 2 is a flow diagram of an exemplary computer-implemented method 200 for causing video game control elements from a video game control composition to be rendered on the second screen device 120 according to positioning instructions associated with an area defined by the composition and scaling instructions that are specific to characteristics of the second screen device 120. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the video game control composition system 102 can detect a request for a video game control composition to be rendered on a second screen device that serves as a game controller for a video game displayed on a first screen device. For example, the video game control composition system 102 can receive the request as part of the initialization of a video game. In more detail, the digital content system 104 can initialize a selected video game by generating game graphics for display on the first screen device 118. The digital content system 104 can further initialize the selected video game by converting the second screen device 120 into a video game controller. As part of that conversion, the compiled programming code of the video game may include a call for a particular video game control composition to be rendered on the second screen device 120. In additional implementations, the compiled programming code of the video game may include additional calls for different video game control compositions to be rendered at different points on the second screen device 120 during game play. In some implementations, the video game control composition system 102 may receive requests for the video game control composition as part of a user request. For example, the video game control composition system 102 may receive the request as part of an initial user game experience configuration associated with a particular video game that allows the user to configure how they would like to interact with video game control elements.

As further illustrated in FIG. 2, at step 204 the video game control composition system 102 can identify the video game control composition that comprises a plurality of video game control elements, positioning instructions for the plurality of video game control elements, and scaling instructions for the plurality of video game control elements. For example, in response to detecting a request or call for the video game control composition, the video game control composition system 102 can access a repository of video game control compositions to identify the requested composition. In at least one implementation, the repository of video game control compositions can store and maintain video game control compositions that are pre-validated. For example, the video game control compositions in the repository may be pre-tested to include video game control elements in combinations and positions that have been shown to be effective in connection with video game play.

At step 206 the video game control composition system 102 can determine one or more characteristics of the second screen device (e.g., the second screen device 120). For example, the video game control composition system 102 can determine characteristics of the second screen device 120 including, but not limited to, a make and/or model of the second screen device 120, a display size of the second screen device 120, and display preferences associated with the second screen device 120. The video game control composition system 102 can determine these and other characteristics by querying the second screen device 120, by accessing stored data associated with the second screen device 120, and/or by accessing stored data associated with the user of the second screen device 120 within the digital content system 104.

Additionally, as illustrated in FIG. 2, at step 208 the video game control composition system 102 can cause the plurality of video game control elements from the video game control composition to be rendered on the second screen device according to the positioning instructions and the scaling instructions in view of the one or more characteristics of the second screen device. For example, the video game control composition system 102 can cause the video game control elements to be rendered on the second screen device 120 according to the positioning instructions that dictate how the video game control elements are positioned relative to each other and the edges of the touch screen display of the second screen device 120.

In more detail, the video game control composition system 102 can cause the selected video game control composition to be rendered within a specific area of the display of the second screen device 120 (e.g., right side, left side, upper left-hand corner, lower right-hand corner, etc.) at an intended size indicated by the composition's scaling instructions. The video game control composition system 102 can further cause the composition to be rendered according to the intended margin indicated by the composition's positioning instructions. If there is not sufficient space in the display of the second screen device 120, the video game control composition system 102 may scale the composition down according to the scaling instructions. Additionally, the video game control composition system 102 may take user-specified and/or device specific overrides into account while rendering the composition in order to shrink margins, avoid safe areas within the display, adhere to user customizations, and so forth.

As discussed above, the video game control composition system 102 can cause the second screen device 120 to render a video game control composition that includes one or more video game control elements in order to enable the second screen device 120 to be used as a video game controller for a selected video game. FIG. 3A-3D illustrate additional detail with regard to how the second screen device 120 causes video game control compositions to be rendered on the second screen device 120.

For example, FIG. 3A illustrates a layout 302*a* on a touch screen display 300 of the second screen device 120. In one or more implementations, the layout 302*a* can include video game control elements 304*a*, 304*b*, 304*c*, 304*d*, 304*e*, and 304*f*. In at least one implementation, the video game control elements 304*a*-304*f* are positioned within the layout 302*a* in at least one area, such as the areas 306*a*, 306*b*, 306*c*, 306*d*, and 306*e*. For example, the video game control element 304*a* (e.g., a joystick control element) may be positioned in the left-hand area 306*a*. Similarly, the video game control elements 304*c*, 304*d*, 304*e*, and 304*f* (e.g., button control elements) may be positioned in the right-hand area 306*c*. Some other video game control elements, such as the game-specific video game control element 304*b* (e.g., a handheld radio button control element), may be positioned in the center area 306*b* and/or the lower area 306*e*.

As discussed above, previous systems may require the video game designer to individually position each of the video game control elements 304*a*-304*f* within the layout 302*a*. Additionally, and as discussed above, previous systems typically provide no guidance as to whether grouping the video game control elements 304*c*-304*f* in the right-hand area 306*c* would be preferred by video game players, or whether positioning the joystick video game control element 304*a* on the left-hand area 306*a* at the given distance from the edge of the touch screen display 300 would be comfortable for most player hand sizes. Instead, the video game designer would have to iteratively modify the size and positioning of the video game control elements 304*a*-304*f* within the layout 302*a* until testing feedback indicated that the layout 302*a* was satisfactory. As discussed above, this process can be slow and wasteful.

To remedy these issues, the video game control composition system 102 can generate and maintain video game control compositions including one or more video game control elements that are pre-validated in terms of usability, positioning, and scalability. For example, as shown in FIG. 3B, the video game control composition system 102 can generate and maintain the video game control compositions 308*a*, 308*b*, 308*c*, 308*d*, and 308*e*. In one or more implementations, the video game control compositions 308*a*-308*e* include one or more video game control elements (e.g., an up-down-left-right control element, small button control elements, large button control elements, joystick control elements).

Additionally, each of the video game control compositions 308*a*-308*e* can include positioning instructions. For example, the positioning instructions for the video game control composition 308*b* can dictate how the video game control composition 308*b* should be positioned relative to one or more edges of the touch screen display 300 of the second screen device 120. To illustrate, the video game control composition 308*b* (e.g., a joystick) may be positioned in either the left-hand area 306*a* or the right-hand area 306*c* of the touch screen display 300. As such, the positioning instructions can dictate that the video game control composition 308*b* should be positioned at an intended margin of 20 pixels but no less than a smallest margin of 15 pixels from the left edge of the touch screen display 300 when in the left-hand area 306*a*. The positioning instructions can dictate the same or different margins for the video game control composition 308*b* when it is in the right-hand area 306*c*.

Moreover, each of the video game control compositions 308*a*-308*e* can include scaling instructions. For example, the scaling instructions for the video game control composition 308*e* may dictate how the size and positioning of the button control elements therein change based on the characteristics of the implementing second screen device 120. To illustrate, if the display size of the second screen device 120 is larger (e.g., as with a tablet second screen device), the scaling instructions for the video game control composition 308*e* may instruct for the video game control composition 308*e* to be scaled up such that the button control elements therein are rendered at a 20% increase in size and at positions that are 20 pixels farther away from each other. Conversely, if the display size of the second screen device 120 is typical (e.g., such as with a smartphone), the scaling instructions for the video game control composition 308*e* may instruct for the video game control composition 308*e* to be rendered at its intended size. Additional detail with regard to video game control composition positioning and scaling instruction is given below with regard to FIG. 3D.

In one or more implementations, a video game may include references to any of the video game control compositions 308*a*-308*e*. As such, upon initialization or at any other point during game play, the video game control composition system 102 may detect a request for one or more of the video game control compositions 308*a*-308*e* to be rendered on the second screen device 120. The video game control composition system 102 can then cause the requested video game control compositions to be rendered on the second screen device 120 according to their positioning and scaling instructions. Additional implementations may include video game control compositions of any configuration.

For example, FIG. 3C illustrates example layouts 302*b*, 302*c*, 302*d*, and 302*e* that the video game control composition system 102 can cause to be rendered on the second screen device 120 including various combinations of the video game control compositions 308*a*-308*e*. Thus, rather than requiring the video game to request each of the five video game control elements in the layout 302*e* separately, for example, the video game control composition system 102 can cause the layout 302*e* to be rendered on the second screen device 120 in response to detecting a request for the video game control composition 308*a* and a request for the video game control composition 308*c*. In at least one implementation, the video game control composition system 102 may receive both requests simultaneously.

As mentioned above, the video game control composition system 102 can cause a video game control composition to be positioned and scaled according to characteristics of the second screen device 120. To illustrate, FIG. 3D shows the layout 302*d* including the video game control composition 308*b* and the video game control composition 308*e* on the touch screen display 300 of the second screen device 120. FIG. 3D also shows the layout 302*d* on the larger touch screen display 300' of the second screen device 120' (e.g., a tablet computing device). In one or more implementations, the positioning and scaling instructions associated with the video game control compositions 308*b* and 308*e* within the layout 302*d* can dictate how the positioning and scaling of the video game control composition 308*b*, 308*e* changes from one second screen device 120 to the other second screen device 120'.

For example, in at least one implementation, the positioning and scaling instructions can follow an algorithm or a series of steps to dictate how a video game control composition is displayed on a touch screen display (e.g., either the touch screen display 300 or the touch screen display 300'). For example, when the video game control composition system 102 initially causes the second screen device 120 to render a video game control composition, the positioning and scaling instructions can dictate an intended size of the video game control composition. The positioning and scaling instructions can further dictate intended margins indicating how far the video game control composition (e.g., the outermost edge of the outermost video game control element within the video game control composition) should be placed from an edge of the touch screen display. To illustrate, the positioning and scaling instructions for the video game control composition 308*e* may dictate that the video game control elements within that composition should be sized as shown and should have an intended margin of 50 pixels from the right-hand edge of the touch screen display 300. In at least one implementation, as discussed above, the intended size and margins associated with the video game control composition 308*e* may be determined to be optimal based on research and testing.

The positioning and scaling instructions can further determine whether there are any user-driven or device-specific overrides to take into account. For example, the bezel of the touch screen display 300 may be large enough that the intended margin of the video game control composition 308*e* can be reduced (e.g., but not less than the smallest margin indicated by the positioning and scaling instructions). As such, the video game control composition system 102—in light of the positioning and scaling instructions—can determine whether this override should be applied based on characteristics of the second screen device 120 that can be indicated by the make and model of the second screen device 120.

The positioning and scaling instructions can further determine whether placement of a video game control composition conflicts with one or more "safe areas" of a second screen device. As used herein, a "safe area" can refer to an area within a touch screen display that should not include any user interface elements (e.g., as dictated by the make and/or model of the second screen device 120). For example, the touch screen display 300 of the second screen device 120 may include a safe area toward the far right-hand side of the touch screen display 300. As such, the positioning and scaling instructions associated with the video game control composition 308*e* can dictate that the intended margin should be modified based on this safe area.

At this point, the positioning and scaling instructions can further scale the video game control composition 308*e* based on other display considerations. For example, the video game control composition 308*e* may require 200 pixels of display space beyond the intended margin. Other video game control compositions (e.g., the video game control composition 308*b*) may be positioned such that there is not 200 pixels of display space remaining. In light of this, the positioning and scaling instructions can dictate that the video game control composition 308*e* should be scaled down by a threshold percentage. In one or more implementations, the video game control composition system 102 may prioritize positioning video game control compositions according to their intended margins over scaling the same video game control compositions. As such, the video game control composition system 102 may reduce margins associated with a composition down to their smallest sizes before beginning to scale the composition down to a smaller size.

The positioning and scaling instructions can also indicate the same steps in connection with the larger touch screen display 300' on the second screen device 120'. For example, the positioning and scaling instructions can place the video game control composition 308*e* within the touch screen display 300' according to its intended margin. In at least one implementation, the positioning and scaling instructions dictate that an intended margin for the video game control composition 308*e* is proportional to the size of whatever touch screen display where it is displayed. The positioning and scaling instructions can also take overrides and safe areas into account. Overall, the positioning and scaling instructions may seek for the associated video game control composition to have a consistent size and edge distances-no matter the size of the second screen device 120.

In one or more implementations, the positioning and scaling instructions can further dictate video game control composition placement in view of device balance. For example, the smaller second screen device 120 may be balanced such that it is held by its bottom corners during use. The same hand placement in connection with the second screen device 120' would be unbalanced and cause a risk of the second screen device 120' being dropped. As such, the positioning and scaling instructions can dictate that the placement of the video game control composition 308*e* moves closer to a central balance point of the second screen device 120'. In at least one implement, the video game control composition system 102 can determine the balance point of the second screen device 120' based on its determined characteristics.

As mentioned above, the video game control compositions 308*b*, 308*e* can be pre-validated such that the size and placement of the video game control elements therein are very likely to be comfortable and well-balanced during game play when used in connection with the larger touch screen display 300' of the second screen device 120'-just as the same video game control elements are very likely to be comfortable and well-balanced during game play when used in connection with the touch screen display 300 of the second screen device 120.

As mentioned above, and as shown in FIG. 4, the video game control composition system 102 performs various functions in connection with causing video game control compositions to be rendered on the second screen device 120. FIG. 4 is a block diagram 400 of the video game control composition system 102 operating within the memory 106 of the server(s) 112 while performing these functions. As such, FIG. 4 provides additional detail with regard to these functions. For example, as shown in FIG. 4, the video game control composition system 102 can include a communication manager 402, a composition manager 404, and a second screen device manager 406. As further shown in FIG. 4, the additional items 108 can store and maintain composition data 410.

In certain implementations, the video game control composition system 102 may represent one or more software applications, modules, or programs that, when executed by a computing device, may cause the computing device to perform one or more tasks. For example, and as will be described in greater detail below, one or more of the communication manager 402, the composition manager 404, or the second screen device manager 406 may represent software stored and configured to run on one or more computing devices, such as the server(s) 112. One or more of the communication manager 402, the composition manager 404, and the second screen device manager 406 of the video game control composition system 102 shown in FIG. 4 may also represent all or portions of one or more special purpose computers to perform one or more tasks.

As mentioned above, and as shown in FIG. 4, the video game control composition system 102 can include the communication manager 402. In one or more implementations, the communication manager 402 can detect requests for video game control compositions to be rendered on the second screen device 120. For example, the communication manager 402 can detect such requests as function calls from compiled video game code during initialization of a video game. The communication manager 402 can further receive characteristic data from the second screen device 120 for use in rendering video game control elements on the second screen device 120.

The communication manager 402 can further send, transmit or provide video game control compositions to second screen devices. For example, the communication manager 402 can transmit rendering instructions to the second screen device 120 that cause the second screen device 120 to render one or more compositions of video game controls on a touch screen display. To illustrate, the communication manager 402 can send instructions that cause the second screen device to identify specific video game controls and assemble the specific video game controls into a particular layout.

As mentioned above, and as shown in FIG. 4, video game control composition system 102 can include the composition manager 404. In one or more implementations, the composition manager 404 generates and stores video game control compositions. For example, the composition manager 404 can generate a video game control composition including references to one or more video game control elements and an area size for the composition (e.g., 500 pixels by 500 pixels), The composition manager 404 can further generate the video game control composition including positioning instructions that dictate sizes for the one or more video game control elements, positions for the one or more video game control elements relative to the area size of the composition and/or relative to the positions of the other video game control elements within the composition, and positions for the video game control composition relative to the display edges of the second screen device 120. The composition manager 404 can further generate the video game control composition including scaling instructions that dictate how the sizes and positions of the one or more video game control elements should change based on the characteristics of the second screen device 120.

In at least one implementation, the positioning and scaling instructions can further dictate areas of the second screen device 120 (e.g., areas within the touch screen display of the second screen device 120) where the video game control composition may or may not be positioned. For example, these additional instructions can dictate that the video game control composition should be positioned on a right-hand size of a smartphone second screen device 120. The same instructions can further dictate that the video game control composition should be positioned in a bottom right-hand corner of a tablet computer second screen device 120. Similarly, the composition manager 404 can generate the video game control composition with positioning and scaling instructions related to the make and/or model of the second screen device 120. For example, the composition manager 404 can generate these positioning and scaling instructions that are customized to the make and/or model of the second screen device 120 in place of or in addition to the display size-based scaling instructions.

In one or more implementations, the composition manager 404 can modify positioning and scaling instructions associated with a video game control composition based on display preferences associated with the second screen device 120. For example, the composition manager 404 can analyze the display preferences associated with the second screen device 120 and modify aspects of the video game control composition by: changing a text size in connection with the video game control elements referenced by the composition, changing display colors associated with the video game control elements referenced by the composition, positioning of the video game control elements referenced by the composition (e.g., to accommodate differently-abled player hands), and so forth.

In one or more implementations, the composition manager 404 can further modify positioning and scaling instructions associated with a video game control composition based on user customizations associated with the second screen device 120. For example, the composition manager 404 can provide a calibration process as part of initializing the video game 103 that asks the player to perform tasks on the touch screen display 300 of the second screen device 120 that can be used to determine information about the player's hand size. To illustrate, the composition manager 404 may ask the player to hold the second screen device 120 and then swipe their thumbs in a semi-circular motion. From this information, the composition manager 404 can dynamically adjust the positions and scaling of video game control compositions and/or adjust the sizes and positions of video game control elements within the video game control compositions. In some implementations, the composition manager 404 can enable the position, size, and scaling of a video game control composition to be directly manipulated by a player. In one or more implementations, the composition manager 404 may override existing positioning and scaling instructions associated with a video game control composition based on these user customizations.

In at least one implementation, the composition manager 404 can further validate video game control compositions. For example, the composition manager 404 can utilize one or more computer models to determine whether a proposed video game control composition meets various benchmarks. To illustrate, the composition manager 404 can train the one or more computer models to determine whether combinations of video game control elements meet various benchmarks, whether relative positions of video game control elements meet various benchmarks, whether display area positioning of the composition meets various benchmarks, and so forth. In response to receiving a prediction from the one or more computer models indicating that a video game control composition meets relevant benchmarks, the composition manager 404 can validate the composition and store the composition in a repository of pre-validated video game control compositions (e.g., as part of the composition data 410 in the additional items 108).

As mentioned above, and as shown in FIG. 4, the video game control composition system 102 can include the second screen device manager 406. In one or more implementations, the second screen device manager 406 can determine characteristics of the second screen device 120. For example, the second screen device manager 406 can receive characteristic data from the second screen device 120. From this data, the second screen device manager 406 can determine characteristics of the second screen device 120 such as, but not limited to, a make of the second screen device 120, a model of the second screen device 120, a display size of the second screen device 120, and display preferences of the second screen device 120.

Additionally, the second screen device manager 406 can cause the second screen device 120 to render video game control elements according to a video game control composition. For example, the second screen device manager 406 can identify video game control elements referenced by a video game control composition from a repository of pre-validated video game control compositions. The second screen device manager 406 can further generate instructions that are specific to the make and or model of the second screen device 120 for the second screen device 120 to render the identified video game control elements according to the instructions associated with the composition. The second screen device manager 406 can transmit the video game control elements and the generated instructions to the second screen device 120 via the communication manager 402. Additionally or alternatively, the second screen device manager 406 can render the video game control composition at the server(s) 112 and then transmit the rendering to the second screen device 120 for local display.

As shown in FIGS. 1 and 4, the server(s) 112 and the digital content receiver 114 can include one or more physical processors, such as the physical processor 110. The physical processor 110 can generally represent any type or form of hardware-implemented processing unit capable of interpreting and/or executing computer-readable instructions. In one implementation, the physical processor 110 may access and/or modify one or more of the components of the video game control composition system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 112 and the digital content receiver 114 can include the memory 106. In one or more implementations, the memory 106 generally represents any type or form of volatile or non-volatile storage device or medium capable of storing data and/or computer-readable instructions. In one example, the memory 106 may store, load, and/or maintain one or more of the components of the video game control composition system 102. Examples of the memory 106 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 112 and the digital content receiver 114 can include the additional items 108. On the server(s) 112, the additional items 108 can include the composition data 410. In one or more implementations, the composition data 410 can include a repository of pre-validated video game control compositions. Additionally, the composition data 410 can include video game control elements, and computer models for use in validating video game control compositions.

In summary, the video game control composition system 102 can generate and implement pre-validated video game control compositions that may be used like puzzle pieces to arrive at an optimal control layout. For example, in response to a video game control composition being encoded into a video game, the video game control composition system 102 can automatically position and scale the video game control elements referenced by the composition in a way that is specific to the second screen device 120 where the video game control elements are used. As such, the video game control composition system 102 avoids the waste previously generated by individually encoding video game control elements into a video game, testing how the individually encoded video game control elements perform, and then modifying the individually encoded video game control elements based on the testing. Instead, the video game control composition system 102 provides video game control compositions that can be encoded into a video game once to give access to multiple video game control elements.

EXAMPLE EMBODIMENTS

Example 1: A computer-implemented method for causing video game control elements within a video game control composition to be rendered on a second screen device according to both positioning instructions and scaling instructions dictated by the composition. For example, the method may include detecting a request for a video game control composition to be rendered on a second screen device that serves as a game controller for a video game displayed on a first screen device, identifying the video game control composition that includes a plurality of video game control elements, positioning instructions for the plurality of video game control elements, and scaling instructions for the plurality of video game control elements, determining one or more characteristics of the second screen device, and causing the plurality of video game control elements from the video game control composition to be rendered on the second screen device according to the positioning instructions and the scaling instructions in view of the one or more characteristics of the second screen device.

Example 2: The computer-implemented method of Example 1, wherein detecting the request for the video game control composition is in response to a programming call within the video game, or a system request as part of initiating the video game.

Example 3: The computer-implemented method of any of Examples 1 and 2, wherein the request for the video game control composition to be rendered on the second screen device includes a request for the plurality of video game control elements from the video game control composition to be rendered in a first area of the second screen device.

Example 4: The computer-implemented method of any of Examples 1-3, further including detecting a request for an additional video game control composition to be rendered in a second area of the second screen device simultaneously with the plurality of video game control elements from the video game control composition in the first area of the second screen device, and causing video game control elements from the additional video game control composition to be rendered in the second area of the second screen device.

Example 5: The computer-implemented method of any of Examples 1-4, wherein determining one or more characteristics of the second screen device includes determining one or more of a make of the second screen device, a display size of the second screen device, or display preferences associated with the second screen device.

Example 6: The computer-implemented method of any of Examples 1-5, wherein the positioning instructions include instructions for rendering a video game control element within the video game control composition relative to an edge of the second screen device.

Example 7: The computer-implemented method of any of Examples 1-6, wherein the scaling instructions include instructions for rendering a video game control element within the video game control composition according to the make of the second screen device and relative to the display size of the second screen device.

Example 8: The computer-implemented method of any of Examples 1-7, wherein causing the plurality of video game control elements from the video game control composition to be rendered on the second screen device further includes causing the plurality of video game control elements from the video game control composition to be rendered on the second screen device according to the display preferences associated with the second screen device.

Example 9: The computer-implemented method of any of Examples 1-8, wherein identifying the video game control composition includes identifying the video game control composition within a repository of pre-validated video game control compositions.

In some examples, a system may include at least one processor and a physical memory including computer-executable instructions that, when executed by the at least one processor, cause the at least one processor to perform various acts. For example, the computer-executable instructions may cause the at least one processor to perform acts including detecting a request for a video game control composition to be rendered on a second screen device that serves as a game controller for a video game displayed on a first screen device, identifying the video game control composition that includes a plurality of video game control elements, positioning instructions for the plurality of video game control elements, and scaling instructions for the plurality of video game control elements, determining one or more characteristics of the second screen device, and causing the plurality of video game control elements from the video game control composition to be rendered on the second screen device according to the positioning instructions and the scaling instructions in view of the one or more characteristics of the second screen device.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to detect a request for a video game control composition to be rendered on a second screen device that serves as a game controller for a video game displayed on a first screen device, identify the video game control composition that includes a plurality of video game control elements, positioning instructions for the plurality of video game control elements, and scaling instructions for the plurality of video game control elements, determine one or more characteristics of the second screen device, and cause the plurality of video game control elements from the video game control composition to be rendered on the second screen device according to the positioning instructions and the scaling instructions in view of the one or more characteristics of the second screen device.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:

detecting, by a server, a request for a video game control composition to be rendered on a second screen device that serves as a game controller for a video game displayed on a first screen device;

identifying, by the server, the video game control composition that comprises a plurality of video game control elements, positioning instructions for the plurality of video game control elements, and scaling instructions for the plurality of video game control elements;

receiving, by the server from the second screen device, data indicative of a hardware feature of a display on the second screen device;

determining, by the server, a layout to be used for the plurality of video game control elements on the second screen device based at least on the positioning instructions, the scaling instructions, and one or more aspects of the hardware feature of the display on the second screen device; and causing, by the server, the plurality of video game control elements from the video game control composition to be rendered automatically on the second screen device according to the determined layout.

2. The computer-implemented method of claim 1, wherein detecting the request for the video game control composition is in response to a programming call within the video game, or a system request as part of initiating the video game.

3. The computer-implemented method of claim 1, wherein the request for the video game control composition to be rendered on the second screen device comprises a request for the plurality of video game control elements from the video game control composition to be rendered in a first area of the second screen device.

4. The computer-implemented method of claim 3, further comprising:

detecting a request for an additional video game control composition to be rendered in a second area of the second screen device simultaneously with the plurality of video game control elements from the video game control composition in the first area of the second screen device; and causing video game control elements from the additional video game control composition to be rendered in the second area of the second screen device.

5. The computer-implemented method of claim 4, wherein determining the hardware feature of the display comprises determining one or more of a make of the second screen device or a display size of the second screen device.

6. The computer-implemented method of claim 1, wherein:

the hardware feature indicated by the data comprises an edge of the display on the second screen device; and the positioning instructions comprise instructions for rendering a video game control element within the video game control composition relative to the edge of the display on the second screen device.

7. The computer-implemented method of claim 1, wherein:

the hardware feature indicated by the data comprises a display size of the display on the second screen device; and the scaling instructions comprise instructions for rendering a video game control element within the video game control composition based at least in part on the display size of the display on the second screen device.

8. The computer-implemented method of claim 1, wherein causing the plurality of video game control elements from the video game control composition to be rendered on the second screen device further comprises causing the plurality of video game control elements from the video game control composition to be rendered on the second screen device according to display preferences associated with the second screen device.

9. The computer-implemented method of claim 1, wherein identifying the video game control composition comprises identifying the video game control composition within a repository of pre-validated video game control compositions.

10. The method of claim 1, wherein causing the plurality of video game control elements from the video game control composition to be rendered on the second screen device comprises:

identifying, based at least in part on the positioning instructions, an area of the second screen at which one of the video game control elements is to be rendered; and modifying, by the server, a size of the one of the video game control elements within the area of the second screen based at least in part on the scaling instructions and the hardware feature of the display on the second screen device.

11. The method of claim 1, wherein causing the plurality of video game control elements from the video game control composition to be rendered on the second screen device comprises sending, by the server, the video game control composition to the second screen device such that the second screen device is able to render the plurality of video game control elements from the video game control composition based at least in part on the positioning instructions, the scaling instructions, and the hardware feature of the display on the second screen device.

12. The method of claim 1, wherein:

the hardware feature indicated by the data comprises a display size of the second screen device; and further comprising ensuring, by the server, that the video game control composition is rendered with a consistent size by:

causing the second screen device to position the plurality of video game control elements relative to an edge of a display on the second screen device based at least in part on the display size and a relative distance from the edge defined by the positioning instructions; and causing the second screen device to scale the plurality of video game control elements relative to the display size of the second screen device based at least in part on the scaling instructions.

13. A system comprising:

at least one physical processor incorporated in a server; and physical memory that is incorporated in the server and comprises computer-executable instructions that, when executed by the at least one physical processor, cause the server to perform acts comprising:

detecting a request for a video game control composition to be rendered on a second screen device that serves as a game controller for a video game displayed on a first screen device;

identifying the video game control composition that comprises a plurality of video game control elements, positioning instructions for the plurality of video game control elements, and scaling instructions for the plurality of video game control elements;

receiving, from the second screen device, data indicative of a hardware feature of a display on the second screen device;

determining a layout to be used for the plurality of video game control elements on the second screen device based at least on the positioning instructions, the scaling instructions, and one or more aspects of the hardware feature of the display on the second screen device; and causing the plurality of video game control elements from the video game control composition to be rendered automatically on the second screen device according to the determined layout.

14. The system of claim 13, wherein detecting the request for the video game control composition is in response to a programming call within the video game, or a system request as part of initiating the video game.

15. The system of claim 13, wherein the request for the video game control composition to be rendered on the second screen device comprises a request for the plurality of video game control elements from the video game control composition to be rendered in a first area of the second screen device.

16. The system of claim 15, further comprising computer-executable instructions that, when executed by the at least one physical processor, cause the at least one physical processor to perform acts comprising:

detecting a request for an additional video game control composition to be rendered in a second area of the second screen device simultaneously with the plurality of video game control elements from the video game control composition in the first area of the second screen device; and causing video game control elements from the additional video game control composition to be rendered in the second area of the second screen device.

17. The system of claim 16, wherein determining the hardware feature of the display comprises determining one or more of a make of the second screen device or a display size of the second screen device.

18. The system of claim 17, wherein the positioning instructions comprise instructions for rendering a video game control element within the video game control composition relative to an edge of the second screen device.

19. A non-transitory computer-readable medium comprising one or more computer-executable instructions that, when executed by at least one processor of a server, cause the server to:

detect a request for a video game control composition to be rendered on a second screen device that serves as a game controller for a video game displayed on a first screen device;

identify the video game control composition that comprises a plurality of video game control elements, positioning instructions for the plurality of video game control elements, and scaling instructions for the plurality of video game control elements;

receive, from the second screen device, data indicative of a hardware feature of a display on the second screen device;

determine a layout to be used for the plurality of video game control elements on the second screen device based at least on the positioning instructions, the scaling instructions, and one or more aspects of the hardware feature of the display on the second screen device; and cause the plurality of video game control elements from the video game control composition to be rendered automatically on the second screen device according to the determined layout.

20. The non-transitory computer-readable medium of claim 19, wherein the request for the video game control composition to be rendered on the second screen device comprises a request for the plurality of video game control elements from the video game control composition to be rendered in a first area of the second screen device.

* * * * *